May 19, 1936.  L. G. GATES ET AL  2,041,061
TOOL JOINT CUT-OFF DEVICE
Filed April 18, 1934  2 Sheets-Sheet 1
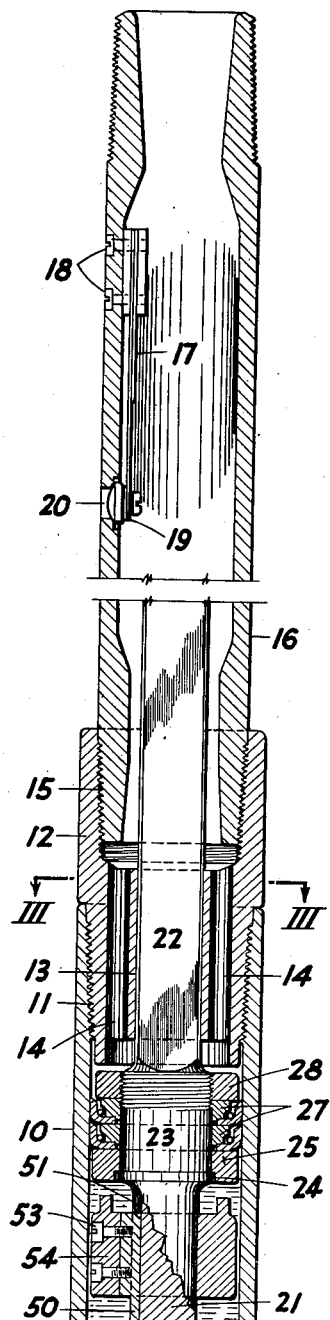
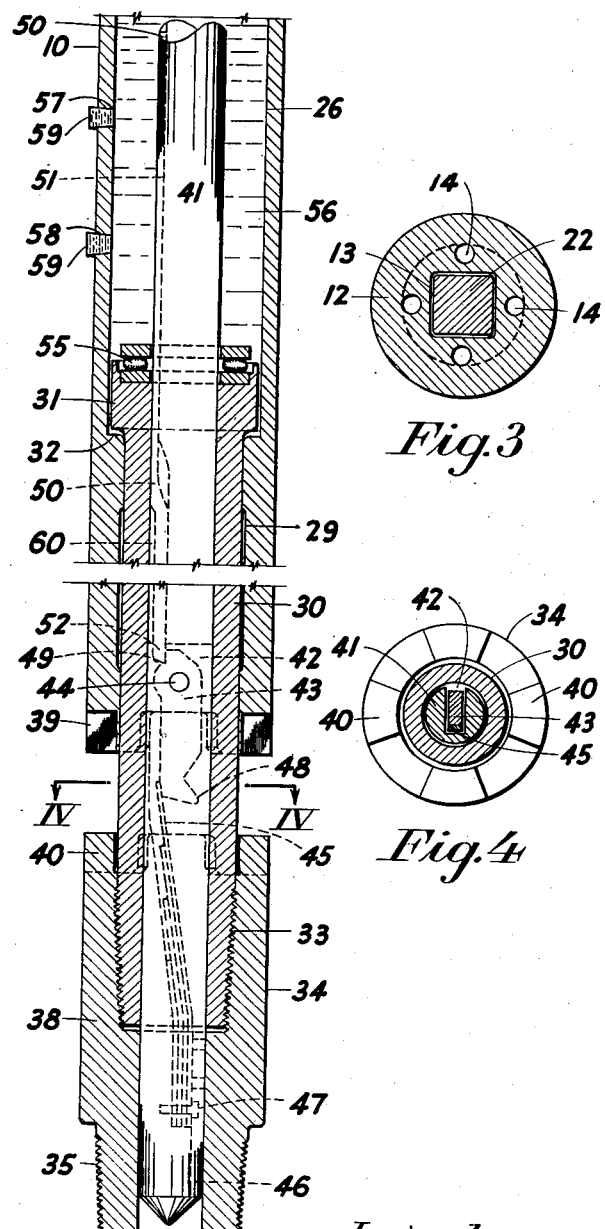
Inventors
Leroy G. Gates
Henry N. Herrick
Omar A. Cavins
William R. Postlewaite
By: *J. H. Adams*
Attorney May 19, 1936.                L. G. GATES ET AL                2,041,061
                        TOOL JOINT CUT-OFF DEVICE
                         Filed April 18, 1934              2 Sheets-Sheet 2

Inventors
Leroy G. Gates
Henry N. Herrick
Omar A. Cavins
William R. Postlewaite
By: Attorney Patented May 19, 1936

2,041,061

UNITED STATES PATENT OFFICE 2,041,061

TOOL JOINT CUT-OFF DEVICE

Leroy G. Gates, Bakersfield, Henry N. Herrick and Omar A. Cavins, Berkeley, and William R. Postlewaite, San Francisco, Calif., assignors to Standard Oil Company of California, San Francisco, Calif., a corporation of Delaware Application April 18, 1934, Serial No. 721,180

9 Claims. (Cl. 81—193)

This invention relates to deep well fishing tools and particularly to those which are adapted to be placed in a well to remove drill pipe, tubing, or the like that has become stuck in the formation or in cement either through accident or design.

In the drilling of very deep wells by the rotary method, the drill pipe and couplings used therefor must be of extreme strength in order to withstand the impact, tension and torsional stresses involved. Dimensional limitations frequently impose a restriction upon the outside diameter of the drill pipe and also the threaded couplings or "tool joints" used to connect successive lengths or groups of lengths of pipe. In order to make the threaded portions of adequate strength the pipe is upset or thickened internally at the ends, leaving only a small central duct or passage through which the mud fluid may be circulated to the drill bit.

The tool joints which couple together the joints or lengths of pipe are similarly made with thick walls, with a central passage of comparable diameter to that of the drill pipe. These tool joints are usually made in two parts, each one fitted with a female thread for attachment to the drill pipe. One half of the joint is known as the pin and has a male thread, usually of relatively coarse pitch. The cooperating half of the joint is called the box and has a female thread of correspondingly coarse pitch. The actual making up and breaking of the pipe sections is done with these coarse threads, and, as the joint material is usually a hardened alloy steel, there is less wear and damage than if the relatively softer pipe threads were so utilized.

The drilling of wells deeper than 1½ miles, particularly where a number of strings of successively smaller diameter casing have been set requires drill pipe that is almost as large as the inside diameter of the casing in which it operates. Thus, when a break occurs, or a cementing operation is unsuccessful and leaves cement about the drill pipe there may not be room between the casing and the pipe to accommodate a conventional "overshot" type of fishing tool. In case the detached drill pipe is cemented in or has become stuck in the formation of an uncased bore, the only alternative has been to grind up drill pipe, tool joints and all with an end milling tool, which is expensive, slow and laborious, particularly where hardened tool joints have been used, and may result in a crooked hole or a loss of the well.

Broadly speaking, this invention contemplates a tool provided with means to enter the restricted bore of a drill pipe or similar structure, extend thereinto for a certain distance and then be effective to cut off the drill pipe at a point below its upper end so that the section thus detached, which may include a tool joint, may be removed from the well, all of which operations are readily and positively actuated and controlled from the derrick floor and with the conventional and normal equipment there available.

It is an object of this invention to provide a drill pipe cut off tool that may be put into well casing to engage a drill pipe therein and which is fitted with an extensible cutter mechanism adapted to enter the bore of said drill pipe to sever the same.

Another object is to provide a cut off tool for wells in which a hydraulically actuated piston is adapted to extend a cutter shaft into the bore of a tubular member and the tool rotated to cut off a portion of said member, whereupon the severed portion may be removed from the well by said tool.

Another object is to provide a cut off tool for wells in which a cutting element is maintained in a retracted or latched position until said element is in place within the bore of a tubular member, whereupon it may be released to its operative position from a remote point.

Another object is to provide a cut off tool for wells adapted selectively to engage a connecting member with a drill pipe and then be released therefrom to turn a cutting element within the said drill pipe to sever the same, after which the severed portion is withdrawn with the tool.

These and other objects will be more fully apparent from the following description and from the appended drawings, which form a part of this specification and illustrate a preferred embodiment of this invention. In the drawings:

Figure 1 is a longitudinal sectional view of the upper portion of the cut off tool constituting the hydraulic cylinder, piston and cutter shaft driving means, all in their upper or retracted positions.

Figure 2 is a longitudinal sectional view of the lower portion of the cut off tool, a continuation of Figure 1, and shows the cutter latch, the tool joint tap and the clutch therefor, and the cutter element, all in their retracted positions and ready to be placed in a well.

Figure 3 is a transverse section taken on line III—III of Figure 1, showing the cutter shaft driving means and the mud fluid passages for actuating the hydraulic piston and also for draining the fishing string of drill pipe during withdrawal from the well.

Figure 4 is a transverse section taken on line IV—IV of Figure 2, showing the jaw clutch for the tool joint tap and the cutter element in its retracted position.

Figure 5:
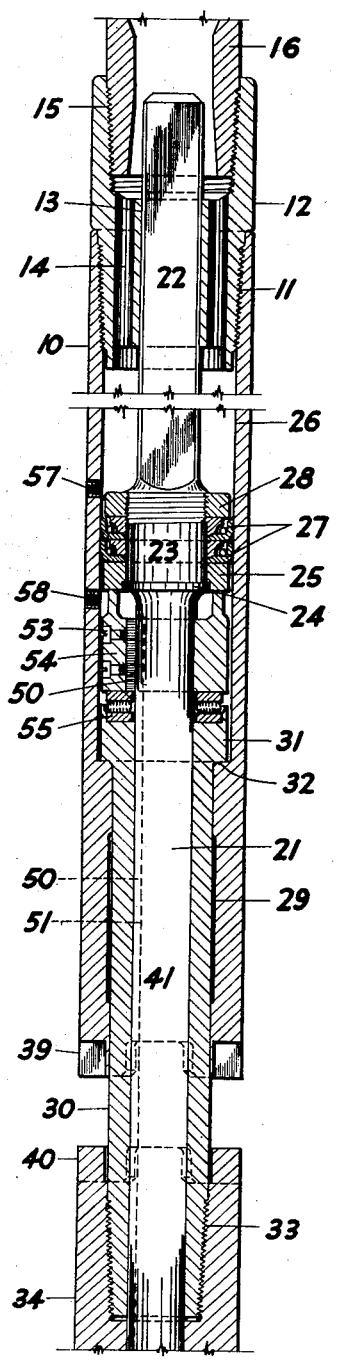
Figure 5 is a longitudinal sectional view of the upper portion of the cut off tool, corresponding to Figure 1, except with the piston and shaft in their lower or extended positions.

Referring to the drawings and particularly to Figures 1 and 2, the numeral 10 designates a tubular member which comprises the body of the tool and is threaded at its upper end to accommodate a similarly threaded tool joint adapter 12. Adapter 12 is provided with a central longitudinal bore 13, of square configuration (Figure 3) and also has a plurality of mud fluid passages 14. At its upper end, adapter 12 is threaded at 15 to receive a section of conventional drill pipe 16, constituting the lowest of a "fishing" string of drill pipe by which means the tool may be placed into or withdrawn from the well bore in the usual manner. Intermediate the ends of pipe 16 is fitted a back pressure relief valve which may comprise a spring 17 secured to the wall of the pipe by screws 18 and carrying plug 19, the latter adapted to seat in drilled passage 20, so that, as the tool is introduced into the well, the mud fluid may enter the initially empty bore of pipe 16.

A shaft 21 in tubular member 10 is provided with a square section 22 to conform to bore 13 in adapter 12, thus keying the shaft to the body 10, and also has an enlarged boss 23 intermediate its length with a flange 24 to receive a piston head 25. In order to provide a fluid tight fit between the piston head 25 and the bore 26 of tubular body 10, a plurality of conventional packing ring units 27 are placed on boss 23 and are clamped thereon by a nut 28. Thus a hydraulic cylinder and piston are formed by the cooperation of piston head 25, packing 27 and bore 26 of body 10, so that mud fluid forced into drill pipe 16 will pass through passages 14 and force piston head 25 and shaft 21 from the upper position shown in Figure 1 to the lower position shown in Figure 5, as will be explained below.

The lower portion of tubular body 10 is provided with a restricted bore 29 (Figure 2) in which a sleeve 30 is slidably fitted. Sleeve 30 is provided with an annular flange 31 at its upper end which seats on face 32 in tubular member 10 so that it cannot pass entirely out of bore 29. The lower end of sleeve 30 is threaded at 33 into a tool joint tap 34, the male threads 35 of this tap being adapted to enter, clean out and engage a tool joint pin 36 at the top of the "fish" or stuck drill pipe 37. As explained above, tool joint 37 may consist of a pin 36 and a box 38 of hardened alloy steel. It is obvious that any other threaded tap or die or similar means could be substituted for the members just described, the object being to provide a structure that will selectively and positively engage the upper end of the "fish" 37.

The lower end of tubular body 10 is fitted with spaced projections 39 which are adapted to mesh with corresponding projections 40 on tap 34 to form a jaw clutch when sleeve 30 is telescoped inside of body 10. Thus, when the two elements are engaged, a turning force applied to body 10 through the medium of drill pipe 16 will be transmitted to tap 34 to engage or disengage the latter with the tool joint 36—38 on the stuck pipe or fish 37.

Figure 6:
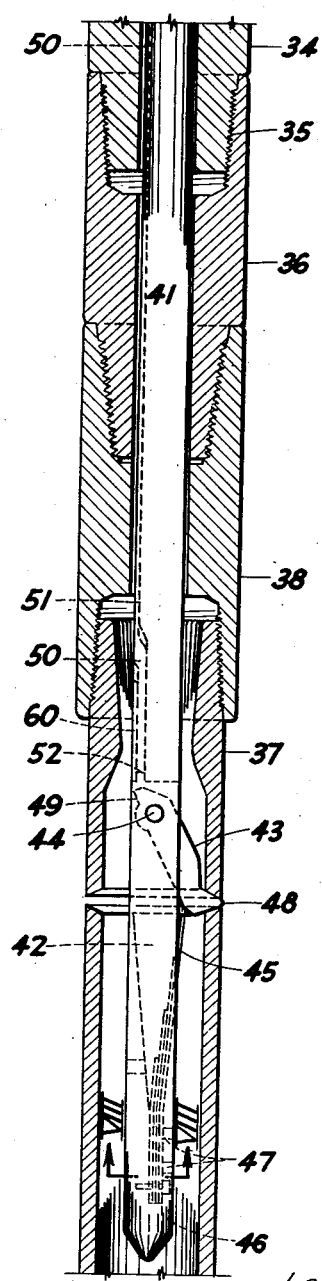
Figure 6 is a longitudinal sectional view of the lower portion of the cut off tool, corresponding to Figure 2, except with the tool joint tap engaged in a tool joint on a drill pipe, and the cutter element in released position to cut off the said drill pipe.
Figure 7:
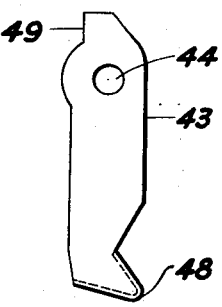
Figure 7 is an enlarged side elevation of a suitable cutter element.
Figure 8:
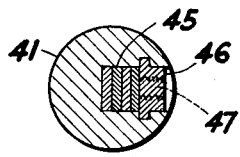
Figure 8 is an enlarged section on line VIII—VIII of Figure 6 showing the method of keying the cutter spring to the shaft.

Shaft 21 extends downwardly as a round section 41 from boss 23 through the bore of sleeve 30, and carries a cutter mechanism best illustrated in Figures 6 and 7. A longitudinal slot 42 in shaft section 41 is adapted to receive a cutter element 43 which is pivoted on pin 44 and is urged outwardly by a leaf spring 45. Spring 45 is preferably laminated and may be secured in the slot 42 by a recessed key 46 and screws 47 (Figure 8). Cutter element 43 is provided at its lower end with a transversely extending cutting face 48 and at its upper end with a sear notch 49. A latch bar 50 is adapted to slide in a longitudinal groove 51 in section 41 of shaft 21 and the tip 52 of bar 50, when in its lowest position, is adapted to engage sear notch 49 to hold cutter element 43 in its shielded or retracted position in slot 42 of the said shaft, as shown by the dotted lines of Figure 2. A cover member 60 is secured in shaft 41 over the lower portion of bar 50 to take the side thrust of cutter 43 in its retracted position.

Latch bar 50 extends substantially the full length of section 41 of shaft 21 and is secured at its upper end by screws 53 to an annular latch collar 54 which surrounds section 41 within bore 26, and which is adapted to be engaged and forced upwardly with respect to piston head 25 by seating on the upper end of sleeve 30, when the piston and shaft are forced downwardly by fluid pressure in bore 26. Latch bar 50 and collar 54 naturally are required to turn with shaft 21 when the latter is rotated to cut off the drill pipe 37 (Figure 6), so that an anti-friction thrust bearing 55 is preferably fitted between collar 54 and flange 31 on sleeve 30.

In preparing the tool for operation, a suitable clamp (not shown) may be used to depress the spring 45 and allow cutter element 43 to assume its retracted position, whereupon latch bar 50 is moved downwardly so that tip 52 is engaged in sear notch 49 of cutter member 43, thus holding the latter in its retracted or shielded position within slot 42 in shaft section 41. In order to prevent chipping or breaking of the hardened cutting face 48 when cutter 43 is released, the tip of cutter 43 is preferably given a heavy coating of a high melting point asphalt, gum or the like, which is quickly worn through when cutting operations are begun. Shaft 21 is then moved to its upper or retracted position as shown in Figures 1 and 2 so that it is completely shielded and protected within the body 10, sleeve 30 and tap 34. Heavy grease 56 is pumped into bore 26 in body 10 through the two tapped holes 57 and 58, which are subsequently closed by corks or wooden plugs 59. The grease 56 serves to hold the shaft 21 in place in its upper or retracted position while the tool is being run into the well bore on drill pipe 16, and the said grease is readily forced out through holes 57 and 58 by the mud fluid which is subsequently pumped into the tool to extend the shaft and cutting member thereon into operative position. Hole 57 also serves as a mud fluid drain when the tool is being withdrawn after use.

In operation, the tool is prepared as described and is run into the hole until tap 34 or its equivalent seats upon the top of the stuck drill pipe or, in this example, the tool joint pin 36. The weight of the drill pipe will cause sleeve 30 to telescope into body 10, so that the jaw clutch formed by projections 39 and 40 will mesh. The drill pipe fishing string carrying the tool is then rotated slowly until the cutting threads 35 on tap 34 have securely engaged the tool joint. The drill pipe and tool are then lifted slightly, to disengage the clutch just mentioned, and mud fluid is pumped into drill pipe 16 and bore 26 above piston head 25 forcing the latter downwardly until it finally seats latch collar 54 on flange 31. The last part of the travel, after latch collar 54 has seated on flange 31, and while piston head 25 approaches 54, moves shaft section 41 downwardly with respect to latch bar 50, which withdraws tip 52 from sear notch 49 and permits cutter element 43 to spring outwardly and engage the wall of the stuck pipe or fish 37. Simple rotation of the drill pipe 16 and the tool causes the squared upper bore 13 to rotate the squared upper section 22 of shaft 21, turning the cutter element 43 to sever the pipe 37, as shown in Figure 6. During this period, sleeve 30, tap 34 and the "fish" 37 are secured together, but remain stationary, sleeve 30 being free to turn within bore 29 and around shaft section 41 by virtue of its configuration and the bearing 55.

Tests have shown that a rotation speed of approximately 50 R. P. M. with a 60 pound initial spring load and a cutting element designed substantially as indicated in Figure 7 and having a Rockwell hardness of 55-60 will cut off a 3½ inch A. P. I. drill pipe in about 30-40 minutes.

After the cut has been made, the whole assembly, carrying the severed piece, may be removed from the well bore and other types of fishing or drilling operations may be performed therein. Should the cutting operation fail, as will be indicated by a resistance to lifting after a suitable period of rotation, the tool string may be dropped to engage the jaw clutch previously described, the tap 34 unscrewed, and the tool brought to the surface for inspection or repair.

It will be appreciated that other details of construction or modes of operation may be substituted for those here described and illustrated, without departing from the essential features of the invention, which appears to reside in the provision of a tool of this character adapted selectively to engage a stuck drill pipe or the like and provided with means to enter the restricted bore of said pipe and there be released to engage the wall of said pipe to cut off the same, all of which operations are actuated and controlled by the operator on the derrick floor, as will be set forth in the following claims.

We claim:

1. A pipe cutting tool comprising a tubular body, a piston in said body, a shaft carried by said piston and movable by hydraulic pressure on said piston to extend from the end of said body and enter a restricted bore of a pipe to be severed, a transversely extensible cutter on said shaft, a latch for said cutter adapted to be actuated by an extension of said shaft from said body to release said cutter to operative position, and means carried by said body and adapted to engage the pipe to be severed to lift the same after its severance, said last named means adapted selectively to be independent of rotation of said body.

2. A pipe cutting tool according to claim 1 in which said last named means comprises a threaded member adapted to engage a correspondingly threaded member on the pipe to be severed.

3. A pipe cutting tool according to claim 1 in which said shaft is keyed to said body so as to be rotated therewith.

4. A pipe cutting tool according to claim 1 with the addition of displaceable means for retaining said piston and shaft in their retracted positions.

5. In a pipe cutting tool having a tubular body, a shaft adapted to be housed within said body, said shaft provided with a transversely extensible cutter, hydraulically actuated means to extend said shaft out of said body through and beyond a restricted bore of a pipe to be severed, and latch means carried by said shaft and adapted to release said cutter into operative position by a movement of said hydraulically actuated means.

6. A pipe cutting tool according to claim 5 with the addition of means carried by said body adapted to engage the pipe to be severed to remove the same.

7. A pipe cutting tool according to claim 5 with the addition of means carried by said body adapted to engage the pipe to be severed to remove the same, said means adapted selectively to be independent of rotation of said body.

8. A device of the character described comprising a tubular body, means carried by said body and adapted selectively to engage a pipe to be severed, and hydraulically actuated means extensible longitudinally through said body and said last named member to enter the bore of said pipe and be rotated by a rotation of said body and independently of said pipe engaging means to sever said pipe.

9. A pipe cutting tool comprising a body, hydraulically actuated means extensible from the end of said body to enter the bore of a pipe to be severed, a cutter on said last named means, and a spring adapted to urge said cutter outwardly and engage the inside of a pipe to sever the same when said body is rotated.

LEROY G. GATES.
HENRY N. HERRICK.
OMAR A. CAVINS.
WILLIAM R. POSTLEWAITE.